United States Patent [19]

Thomas, Jr.

[11] 4,130,145
[45] Dec. 19, 1978

[54] LIQUID DISPENSER FOR VEHICLE AND THE LIKE

[76] Inventor: Paul E. Thomas, Jr., 3421 Louise St., Hapeville, Ga. 30334

[21] Appl. No.: 843,526

[22] Filed: Oct. 19, 1977

[51] Int. Cl.² .............................................. B65B 3/04
[52] U.S. Cl. .................................... 141/88; 141/360; 280/1
[58] Field of Search ................. 141/361, 362, 360, 86, 141/87, 88, 67; 180/1 R; 280/1

[56] References Cited

U.S. PATENT DOCUMENTS

| | | | |
|---|---|---|---|
| 2,054,485 | 9/1936 | Reeves | 141/362 |
| 3,326,417 | 6/1967 | Tinsley | 141/362 |
| 3,351,239 | 11/1967 | Flock | 141/361 |

Primary Examiner—Houston S. Bell, Jr.
Attorney, Agent, or Firm—Patrick F. Henry

[57] ABSTRACT

A dispenser outlet which may be located in the cab of a truck is mounted on a cup support which includes a small drain to which is attached a drain hose leading to the outside. An insulated container, such as a thermos or other insulated container, is located in a remote point such as the back compartment in the tractor or in the trunk of an automobile, and is connected to the dispenser outlet by means of a small plastic hose. A small electrical pump mounted in the bottom on the container is connected to the outlet hose and is operated from the vehicle electrical supply.

10 Claims, 7 Drawing Figures

U.S. Patent   Dec. 19, 1978   Sheet 1 of 2   4,130,145
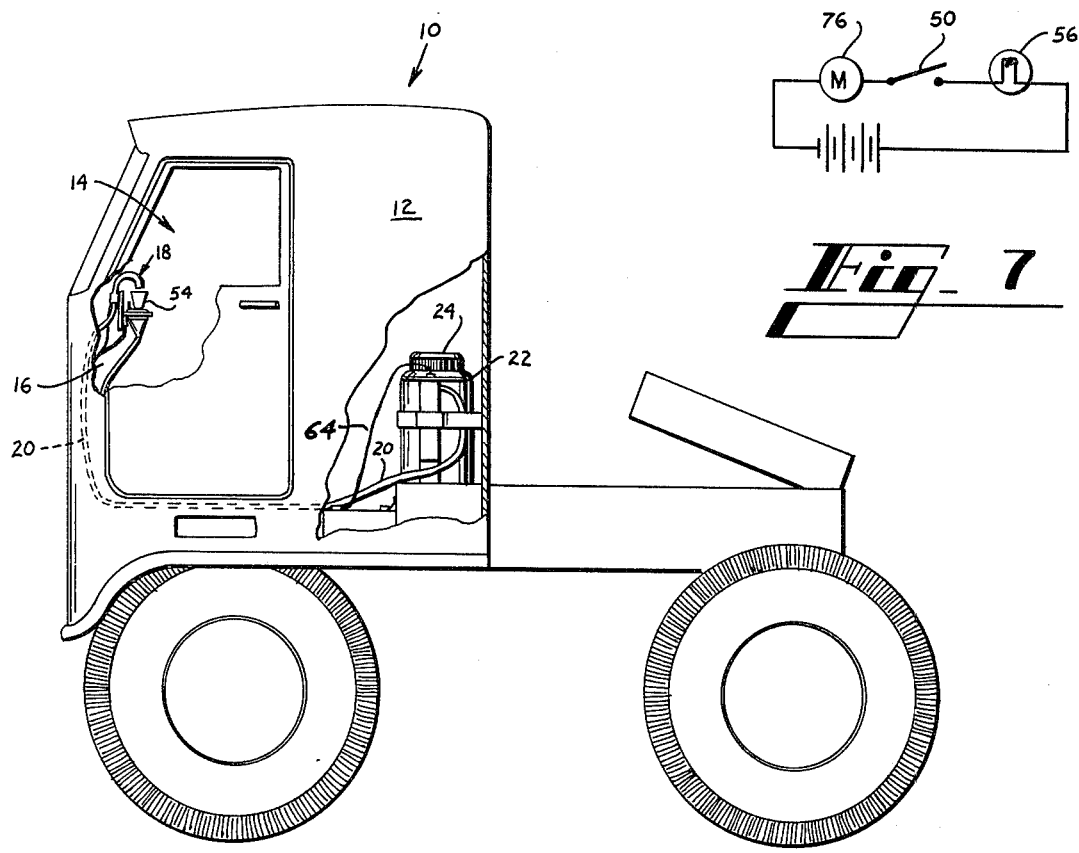
Fig. 7
Fig. 1
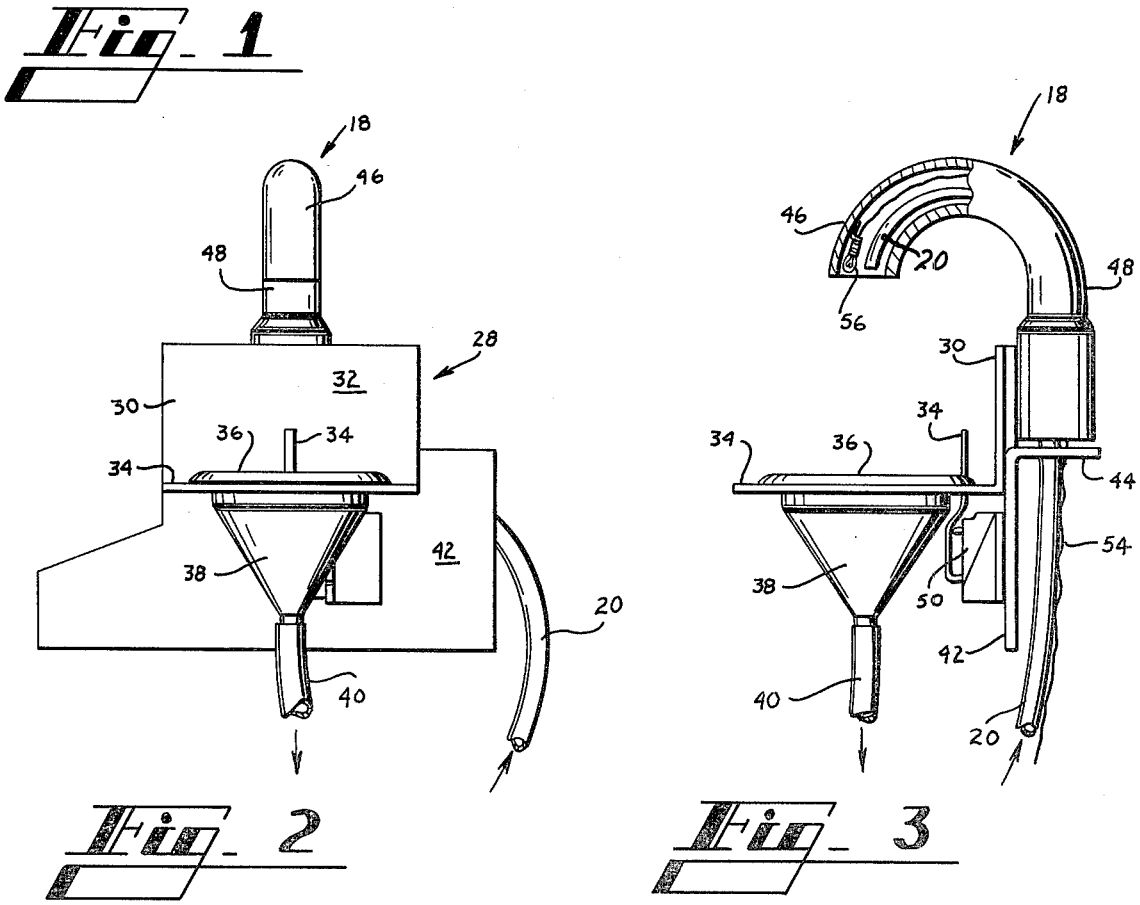
Fig. 2
Fig. 3

LIQUID DISPENSER FOR VEHICLE AND THE LIKE

BACKGROUND OF THE INVENTION

1. Field of the Invention

Dispensing devices especially those comprising dispensing containers with remote outlets connected thereto.

2. Brief Description of the Prior Art

There are vehicle dispensing devices in the prior art including those intended for supplying drinking water to the passengers and drivers of automobiles and other vehicles. In U.S. Pat. No. 3,498,076 there is disclosed a drinking water supply and cooling system for automotive vehicles which utilizes an insulated container but relies upon the air conditioning system of the vehicle and also upon a spacial system of air pressure for dispensing. This is more expensive and elaborate than the present arrangement. There is also a fluid dispenser for automotive use shown in U.S. Pat. No. 3,411,552 which utilizes an insulated container but relies upon gravity feeding of the contents without any provision of delivering same to a remote point. Because space in a vehicle compartment, especially in long distance vehicles, is at a premium, it would not be convenient to use a container of the sort shown in U.S. Pat. No. 3,411,552. Furthermore, it would not be economically feasible or worthwhile to install the system which is disclosed in U.S. Pat. No. 3,498,076 or to maintain and operate same in working order. The present arrangement provides a simple and expedient dispenser for vehicles wherein a small inexpensive pump is used on the container so that the water or other liquid can be easily delivered for distance of many feet.

SUMMARY OF THE INVENTION

A means for storing a quantity of water or other liquid and to maintain same in a cool condition together with a dispensing outlet located at a remote point near the driver of the vehicle and including some pump means electrically operated on the container to deliver the liquid.

An object of this invention is to provide a simple and expedient arrangement utilizing a conventional thermos or insulated container which is provided with a pump means so that liquid can be dispensed at a remote point.

Another object of this invention resides in the particular arrangement in the dispensing outlet and drain which is easily attached and detached from a surface within a vehicle compartment.

Still another object of this invention resides in the arrangement whereby a small pump such as that found in conventional truck windshield washer devices may be employed for purposes of pumping the liquid.

Other and further objects and advantages of this invention will become apparent upon reading the following description of a preferred embodiment taken in conjunction with the accompanying drawings.

BRIEF DESCRIPTION OF THE DRAWINGS

FIG. 1 is a side elevation view of a typical tractor with portions thereof broken away to show the cup support and dispenser within the cab near the driver and the container located in a compartment behind the cab.

FIG. 2 is a front elevation view of the combined dispenser outlet, cup support and drain bracket arrangement which is easily attached and detached within the vehicle driver compartment.

FIG. 3 is a side elevation view of the device shown in FIG. 2.

FIG. 7 is an electric circuit for the device shown in FIGS. 1-6.

DESCRIPTION OF A PREFERRED EMBODIMENT

Figure 4:
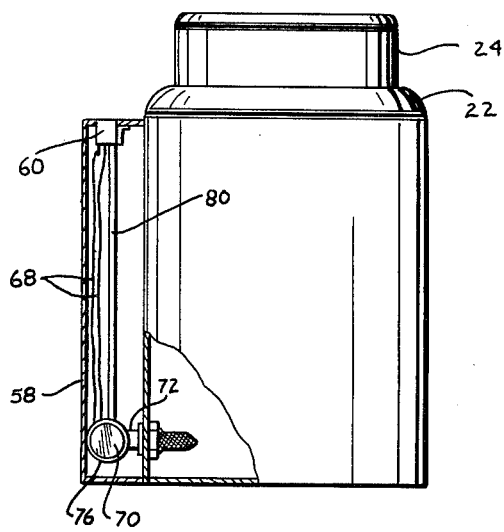
FIG. 4 is a side elevation view of the insulated container.

As mentioned previously the present device is suitable for installation on any vehicle such as automobiles, recreational vehicles, and the tractor of a tractor-trailer arrangement. The conventional tractor 10 shown in FIG. 1 comprises the usual cab 12 which has the front driver's compartment 14 having a front wall 16 on which is removably mounted the combined cup support and dispenser outlet arrangement 18 of the present invention. The dispenser outlet arrangement 18 is connected by tubing 20 to an insulated container 22 located at a distance and in FIG. 1 shown in a compartment behind the driver compartment 14.

Figure 5:
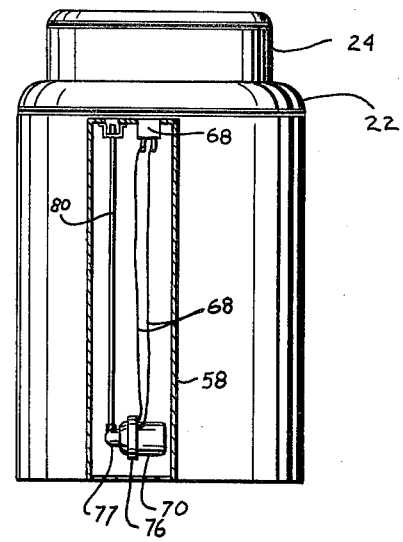
FIG. 5 is a front elevation view of the container shown in FIG. 4.
Figure 6:
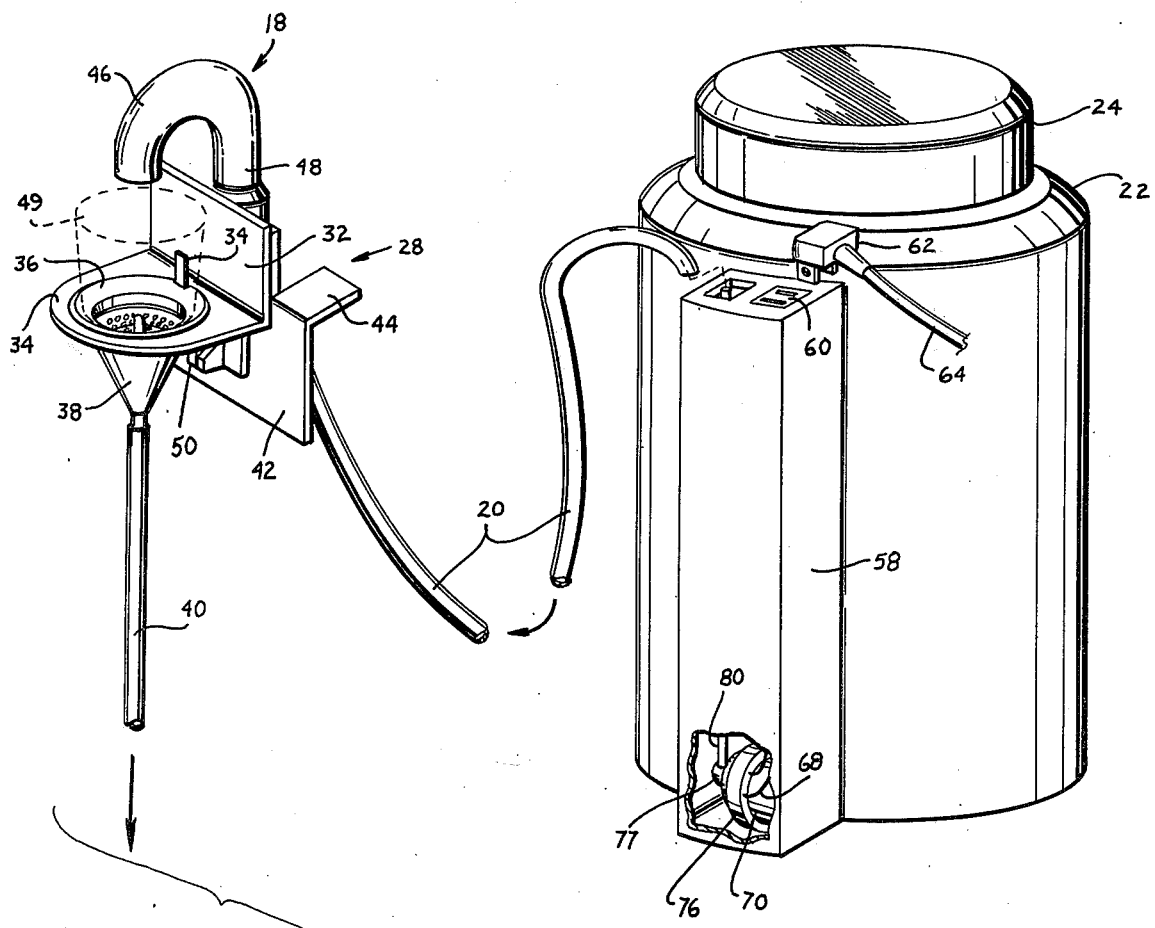
FIG. 6 is a perspective view with portions broken away showing the dispenser device of FIGS. 2 and 3 and the insulated container arrangement of FIGS. 4 and 5.

The insulated container 22 is shown in FIGS. 4 and 5 and will be discussed hereinafter in more detail but is a conventional thermos or insulated 2 gallon or other size container on which there is a large removable top 24 providing access to the interior thereof.

The cup support and dispenser outlet device 18 comprises a mounting bracket 28 having a cup support 30 comprising a back wall 32 normally in vertical position and a horizontal support shelf 34 in which there is a drain opening 36 having a funnel like drain 38 mounted therein which is connected to a drain tubing 40 that extends to the outside of the vehicle 10. The bracket 28 also comprises a mounting portion comprising a mounting plate 42 which is attached to wall 32 and having bent portions 44 which may be fitted over and attached to the vehicle such as to the wall 16. A dispensing outlet 46 comprises a neck 48 which is mounted on the top of plate 42 and through which extends the small plastic tubing 20 connecting the insulated container 22 with the outlet 46. Actually, the tubing extends inside the neck 48 of outlet 46 and terminates just even with the outlet opening in the neck 48 so that a cup 49 supported on the shelf 34 receives the liquid dispensed from the end of the tubing 20.

A conventional electrical on-off single pole switch 50 is mounted on the plate 42 and has a switch actuator member 52 pivoted thereon which extends through the shelf 34 and is operated by contact with cup 49 pushed thereagainst by hand. Switch 50 is connected by a small double electrical insulated wire extending with tubing 20 to the container 22.

There is also a small electrical wire 54 running with the tubing 20 and extending inside neck 48. Wire 54 is connected to a small light 56 located near the outlet opening in neck 48 to provide light whenever the switch actuator 52 is operated.

A vertical housing 58 on container 22 is substantially hollow in the interior and has mounted at the top thereof a conventional electrical outlet 60 which may be connected by a double prong plug 62 leading to an electrical cable 64 connected to the battery and electrical system of the vehicle 10. The outlet 60 is electrically connected through a conduit 68 to a small pump 70 which has a strainer and intake portion thereof 72 mounted within the container 22 and extending through the wall thereof. Pump assembly 70 is a conventional dispensing pump of the sort used in truck vehicles for dispensing windshield cleaner fluid from the container usually carried in the front engine compartment in response to the actuation of the pump switch by the driver to deliver water or cleaning solution to the windshield. The pump assemblies 70 are readily available on the open market and comprise the small inlet and strainer intake portion 72 within the container 22 and within the liquid contained therein and the small electrical motor 76 which electrically operates a small pump 77 that pumps the fluid through an outlet 78 extending vertically along the housing 58 and being connected to the tubing 20. Therefore, when the cup 49 is pushed against the switch actuator 34 the motor 76 on the pump assembly 70 is electrically energized and pumps liquid from container 22 through the outlet 78 and through the small tubing 20 through the outlet spout 46 and into the cup with any overflow or surplus going down through the drain 38 and the drain hose or tubing 40 to the outside.

A plastic tube 80 extends upwardly inside housing 58, next to the electrical conduit 68, and terminates at the top to receive the tube detachably attached thereto.

While I have shown and described a particular embodiment of this invention together with a suggest mode of operation and parts therefor this is by way of illustration only and does not constitute any sort of limitation on the scope of the invention since various alterations, changes, deviations, eliminations, substitutions, revisions and departures may be made in the embodiment shown without avoiding the scope of the invention as defined by a proper interpretation of the appended claims.

What is claimed:

1. In a dispensing device for vehicles:
   an insulated container mounted on said vehicle and having a supply of liquid such as cool water contained therein,
   a small electrically operated pump mounted on said container for pumping liquid therefrom,
   a liquid conduit leading from said pump to a remote point on said vehicle,
   a dispensing outlet mounted within the vehicle operator compartment,
   a cup support mounted adjacent said outlet for supporting a drinking cup thereon to receive a quantity of liquid dispensed from said outlet,
   pump actuation means on said cup support for actuation to operate said pump,
   and switch means operated by said pump actuator means for electrically connecting said switch means to said pump on said container whereby liquid is dispensed into said cup.

2. The device claimed in claim 1 wherein said pump is a small electrically operated pump having a portion thereof extending within said container and to receive liquid contained therein.

3. The device claimed in claim 2 wherein said pump comprises a pump outlet and said conduit being connected to said outlet, electrical connection means mounted on said insulated container and being electrically connected to said pump.

4. The device in claim 1: said cup support comprising a mounting bracket having a mounting plate attachable to a portion of the vehicle,
   a cup support ledge extending from said plate for supporting the cup thereon,
   a drain opening in said cup support plate,
   said dispensing outlet comprising an outlet spout extending above said drain outlet and cup support for dispensing a quantity of liquid therefrom into a cup supported on said cup support,
   a switch actuator mounted on said cup support for actuating said switch means.

5. The device in claim 1: a housing on said container on the outside thereof, an electrical conduit in said housing, a female plug connected to said housing to receive a detachable male plug on said vehicle, and a vertical conduit in said housing connected to said pump, said liquid conduit being attachable to and detachable from said conduit.

6. The device in claim 4: a drain in said cup support ledge, and a drain line leading from said drain.

7. The device claimed in claim 1 wherein there is a light positioned on the dispensing outlet and means for electrically actuating said light upon actuation of said pump actuation means.

8. The device claimed in claim 7 wherein said dispensing outlet is an open member, a light at said dispensing outlet, an electrical conduit connecting said light and said switch means, said switch means being operable to actuate said light simultaneous with the operation of said pump.

9. The device in claim 4 wherein: there is a housing on said container on the outside thereof, an electrical conduit in said housing, an electrical connector on said housing connected to said conduit and to receive electrical supply from said vehicle, a vertical conduit in said housing connected to said pump, said liquid conduit being attachable to and detachable from said conduit.

10. The device in claim 9 wherein: there is a small electrical light mounted on said dispensing outlet to provide light thereto and particularly to said outlet spout during operation, means electrically connecting said light to said switch means and to the electrical supply for said pump so that upon actuation of said switch means said pump and said light are actuated substantially simultaneously.

* * * * *